(12) United States Patent
Fu et al.

(10) Patent No.: US 7,313,238 B2
(45) Date of Patent: Dec. 25, 2007

(54) METHOD AND SYSTEM FOR RELATING CRYPTOGRAPHIC KEYS

(75) Inventors: Kevin E. Fu, Cambridge, MA (US); Mahesh Kallahalla, Palo Alto, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 882 days.

(21) Appl. No.: 10/355,470

(22) Filed: Jan. 31, 2003

(65) Prior Publication Data

US 2004/0151310 A1 Aug. 5, 2004

(51) Int. Cl.
*H04L 9/00* (2006.01)
(52) U.S. Cl. .................. 380/277; 380/278; 380/44
(58) Field of Classification Search ............ 380/262, 380/273, 277, 278, 44
See application file for complete search history.

(56) References Cited

U.S. PATENT DOCUMENTS

| | | | | |
|---|---|---|---|---|
| 6,381,699 | B2* | 4/2002 | Kocher et al. | 713/172 |
| 6,941,457 | B1* | 9/2005 | Gundavelli et al. | 713/163 |
| 7,013,389 | B1* | 3/2006 | Srivastava et al. | 713/163 |
| 2001/0002486 | A1* | 5/2001 | Kocher et al. | 713/171 |
| 2003/0044020 | A1* | 3/2003 | Aboba et al. | 380/278 |
| 2003/0068047 | A1* | 4/2003 | Lee et al. | 380/278 |
| 2003/0081787 | A1* | 5/2003 | Kallahalla et al. | 380/278 |
| 2003/0142826 | A1* | 7/2003 | Asano | 380/277 |
| 2003/0191956 | A1* | 10/2003 | Ishiguro et al. | 713/193 |
| 2004/0017916 | A1* | 1/2004 | Staddon et al. | 380/277 |
| 2004/0101138 | A1* | 5/2004 | Revital et al. | 380/210 |
| 2004/0114762 | A1* | 6/2004 | Medvinsky | 380/277 |

OTHER PUBLICATIONS

M. Naor and B. Pinkas. Efficient Trace and Revoke Schemes. In Proceedings of Financial Cryptography, Feb. 2000, pp. 1-24.*
D. Naor, M. Naor, and J. Lotspiech. Revocation and tracing schemes for stateless receivers. In Advances in Cryptology—CRYPTO 2001, LNCS 2139, pp. 1-34, 2001.*
US related patent application: Title: "System for Enabling Lazy-Revocation Through Recursive Key Generation"; Assignee: Hewlett-Packard Company.
Jessica Staddon, et al.; "Self-Healing Key Distribution With Revocation"; 2002 IEEE Symposium on Security and Privacy (S&P'02).
Amos Fiat, et al.; "Broadcast Encryption"; Date Unknown; pp. 1-12.
Moni Naor, et al.; "Efficient Trace and Revoke Schemes"; Date Unknown.
K.E. Fu, "Group Sharing and Random Access in Cryptographic Storage File Systems," pp. 1-85 (Jun. 1999).

\* cited by examiner

*Primary Examiner*—Kambiz Zand
*Assistant Examiner*—Christopher J Brown

(57) ABSTRACT

A method and system for relating cryptographic keys. A method includes providing to a user a private share related to a key. The method also includes generating a new key based on a previous version of the key and publishing a rotation catalyst. The new version of the key is determinable based on the key rotation catalyst and the private share. Further, former versions of the key are determinable based on the key rotation catalyst.

23 Claims, 4 Drawing Sheets

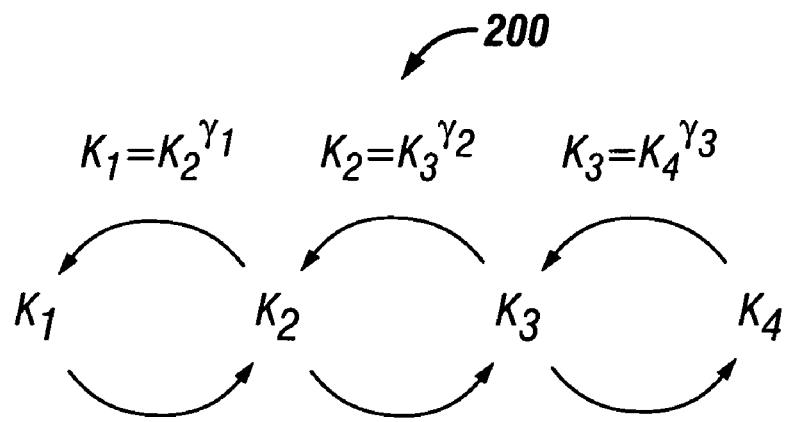
FIG. 2
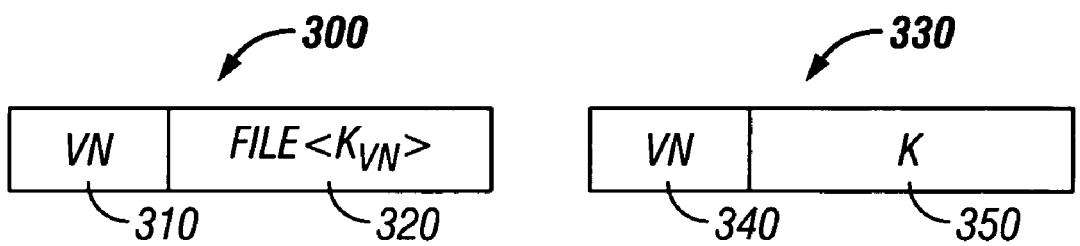
FIG. 3A  FIG. 3B

METHOD AND SYSTEM FOR RELATING CRYPTOGRAPHIC KEYS

TECHNICAL FIELD

The present invention relates to the field of cryptographic key management. Specifically, embodiments of the present invention relate to a method and system for providing cryptographic key management featuring non-interactive key updates and backward key rotation.

BACKGROUND ART

In a conventional cryptographic file system, the data (or files) are stored encrypted. This is a convenient feature especially if an owner of the files cannot trust the administrator of the server to provide adequate security measures to ensure data privacy. To make the conventional cryptographic file system more user-friendly, users typically try to minimize the number of cryptographic keys used to encrypt the files. Otherwise, the number of cryptographic keys may be equal to the number of files that the owner/user may have on the cryptographic keys, which may make managing the cryptographic keys burdensome, and thereby making the cryptographic file system less user-friendly.

In some cases, users share files in a cryptographic file system by having a copy of the encrypted file and an associated decryption key. In this manner, a user may utilize the associated decryption key to decrypt the received encrypted file for access to the file. However, in some instances, an owner of a file may attempt to prevent a previously authorized user from future access to the file, i.e., revoke a user.

One method for revoking a user by an owner of the file is to re-encrypt all the files of the owner with a new cryptographic key. However, re-encrypting all the files is a time-consuming and burdensome task, especially if the owner has encrypted a number of files with the same cryptographic key.

Another solution for revoking a user is described in "Group Sharing and Random Access in Cryptographic Storage File Systems," Master's Thesis, Department of EECS, MIT June 1999, written by Kevin Fu, which is hereby incorporated by reference in its entirety. This solution proposes a technique called lazy revocation where files are to be re-encrypted with a different key only when the file is updated. Accordingly, a revoked user is unable to view any updates to the file. In particular, Fu proposes utilizing a 'lock-box'. The cryptographic key used to encrypt a file is stored in the lockbox. The lockbox is also encrypted with another cryptographic key that is stored in a trusted group server. In the event of a user revocation, all the lockboxes that the revoked user had access to are marked as 'dirty' and any subsequent updates to any dirty file causes that file to be re-encrypted.

Although Fu's design is an adequate solution, the design may have some drawbacks as applied to different types of cryptographic file system architectures. For instance, in a cryptographic system where the file server cannot be trusted (or required) to perform user authentication, Fu's proposal may generate a substantial amount of work for a file owner. In particular, in Fu's proposal, the file server and/or group server are guaranteed that a revoked user (or unauthorized user) cannot see the contents of an encrypted file. In order to meet his constraint in an untrusted server environment, Fu's design can provide security if the design is extended such that the owner changes the group key (in the group server) and re-encrypts all the lockboxes at the time of revocation. Accordingly, this makes revocation expensive in terms of user time and computational resources, especially if the revoked user had access to a large number of files. In essence, this constraint allows lockboxes to perform lazy-re-encryption of the files, but requires immediate re-encryption of the lockboxes as opposed to a more ideal scenario where the revocation process does not interrupt the file owner. Further, since there are now two encryption keys for this file—the current and the former key—additional key storage is required. Further, when a second revocation occurs, the current key becomes the former key and any files protected with the former key must be aggressively re-encrypted.

In general, other conventional secure systems that provide revocation rely on the server checking for user's group membership before granting access. This particular trait requires the servers to store (or cache) information regarding users, which places a high trust requirement on the servers and requires all the servers to maintain this authentication information in a secure and consistent manner.

Other conventional techniques securely send every key update to the user, such that the user is able to decrypt files encrypted with various versions of the key. Unfortunately, the user may fail to receive one or more of the keys. This may be due to the owner being unable to achieve a secure connection to the user when the key updates are provided or simply due to a failure in transferring the new key. In this case, the user is unable to decrypt files for which he lacks the proper key.

Thus, one problem with some conventional methods and systems for providing cryptographic key management is that all of the files need to be re-encrypted with the new key, whenever a new key is needed. Another problem with some conventional methods and systems for providing cryptographic key management is that the user is unable to decrypt files because a new key was not received.

DISCLOSURE OF THE INVENTION

The present invention pertains to a method and system for relating cryptographic keys. In one embodiment, the method comprises providing to a user a private share related to a key. The method also comprises generating a new key based on a previous version of the key and publishing a rotation catalyst. The new version of the key is determinable based on the key rotation catalyst and the private share. Further, former versions of the key are determinable based on the key rotation catalyst.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 illustrates an exemplary diagram of a recursive key generation process in accordance with an embodiment of the present invention.

FIG. 3A illustrates a diagram of an exemplary file structure utilized by an embodiment of the present invention.

FIG. 3B illustrates a diagram of an exemplary cryptographic key structure utilized by an embodiment of the present invention.

DETAILED DESCRIPTION OF THE INVENTION

In the following detailed description of embodiments of the present invention, a method and system for relating cryptographic keys, numerous specific details are set forth in order to provide a thorough understanding of the present invention. However, embodiments of the present invention may be practiced without these specific details or by using alternative elements or methods. In other instances well known methods, procedures, components, and circuits have not been described in detail as not to unnecessarily obscure aspects of the present invention.

In accordance with the principles of embodiments of the present invention, a new cryptographic key may be rotated forward only by the cryptographic key owner/manager. Using a combination of public and private information, the users are able to manipulate the cryptographic key. It is extremely difficult for the users to generate the new cryptographic key without this information. However, using a portion of this information, a user can construct the new cryptographic key without directly communicating with the owner, which may be referred to as non-interactive cryptographic key updates. Users are able to generate previous versions of the cryptographic key from the current cryptographic key and a portion of the information, which may be referred to as backward cryptographic key rotation.

Thus, embodiments of the present invention provide for relating cryptographic keys in which it is not necessary to re-encrypt all the files with the new cryptographic key whenever a new cryptographic key is needed for future file encryption. For example, when a user is revoked a new cryptographic file key is used to encrypt future versions of files. Embodiments allow a user to generate a new cryptographic key without direct interaction with the cryptographic key owner. Embodiments allow a previous version of a key to be generated from a more recent version of the cryptographic key.

Figure 1:
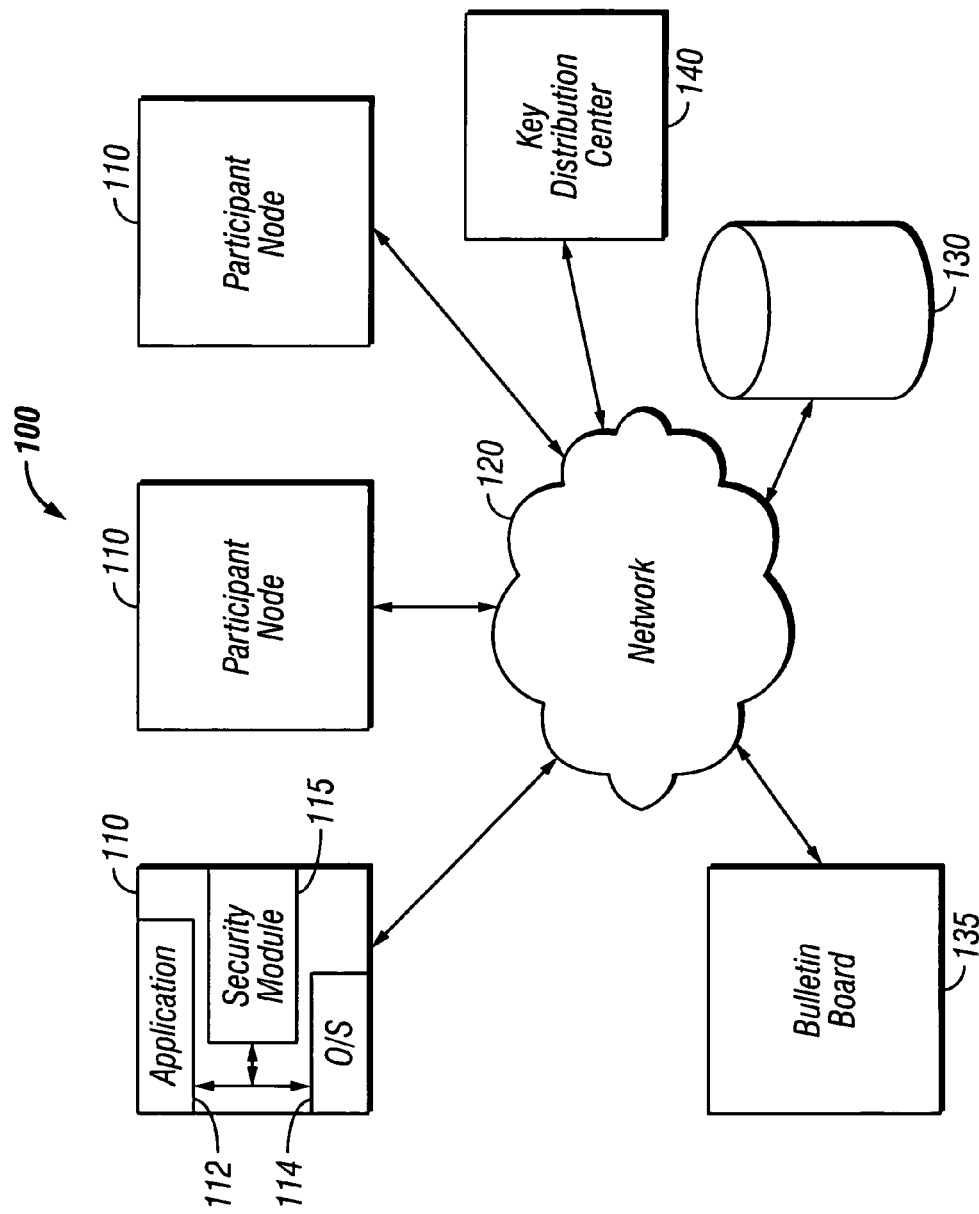
FIG. 1 illustrates a block diagram of a cryptographic key system in which embodiment the present invention may be practiced.

FIG. 1 is a block diagram of a system 100 in which embodiments of the present invention may be practiced. The system 100 includes participant nodes 110 connected to a network 120, and a shared file system 130. Each of the participant nodes 110 may have their own files as well. Furthermore, the system 100 may have a bulletin board 135, which is used to post public shares to be used in cryptographic key management.

The participant nodes 110 of the system 100 may be configured to provide access to or receive computer software applications and/or data. Thus, a participant node 110 may be an owner and/or a user. The participant nodes 110 may be implemented by a personal computer, a laptop computer, a workstation, a portable wireless device, and other similar computing devices. Each participant node 110 may include an application 112, an operating system 114, and a security module 115. FIG. 1 illustrates an exemplary embodiment of the architecture for the participant node 110; however, it should be readily apparent to those of ordinary skill in the art that FIG. 1 represents a generalized schematic illustration of the participant node 110 and that other components may be added or existing components may be removed without departing from the spirit or scope of the present invention.

The application 112 may be a computer software program that is executed on the participant node 110. The application 112 may be a word processing program, a spreadsheet program, a shell program, or any other type of program that generates files to be stored in the shared file system 130. The application 112 may interface with the operating system 114 through an application program interface (API, not shown). The operating system 114 may be configured to manage the software applications, data and respective hardware components (e.g., displays, disk drives, etc.) of the participant node 110. The operating system 114 of the participant node 110 may be configured to interface with the security module 115.

The security module 115 may be configured to perform various key management tasks. When functioning as an owner, this may include generating an initial cryptographic key, which is securely distributed to valid (e.g., authorized) participant nodes 110. The security module 115 may also generate a new cryptographic key based on a version of a previous cryptographic key. This new cryptographic key is not distributed to participant nodes 110. To allow the participant nodes 110 to determine the new cryptographic key in a non-interactive fashion, the security module 115 may also generate and securely distribute to valid participant nodes 110 private shares that are related to the cryptographic key. Further, the security module 115 may also publish a key rotation catalyst and public share information on the bulletin board 135 or elsewhere. A given participant node 110 is able to generate the new cryptographic key based on the old cryptographic key, the participant node's 110 private share, the public share(s), and the key rotation catalyst. In this fashion, the user participant node 110 does not need to directly contact the owner participant node 110 to receive a cryptographic key update.

The security module 115 may also be configured to recursively generate cryptographic keys. For example, when functioning as a user node the security module 115 may be configured to generate previous versions of the cryptographic key based on the current cryptographic key and the key rotation catalyst. The security module 115 may also be configured to attach a header file (or metadata) to the encrypted file. The header file may provide the capability for other authorized users to determine which version of the cryptographic key was used to encrypt the file. In this fashion, if a user misses one or more key updates, the user can still decrypt files that were encrypted with a former version of the cryptographic key.

Authorized users may use the security module 115 to determine which version of the cryptographic key is necessary to decrypt a given file. The security module 115 may be implemented as a software program, a utility, a subroutine, or other similar programming entity. Alternatively, the security module 115 may be implemented as an electronic device utilizing an application specific integrated circuit, discrete components, solid-state components or combination thereof.

The participant nodes 110 may be further configured to interface with the network 120 through a respective network interface (not shown). The network 120 may be configured to provide a communication channel between each participant node 110 and the shared file system 130. The network 120 may be a wired network (e.g., PSTN, fiber optic, etc.), wireless network (e.g., text messaging, Wireless Application Protocol, etc.), or combination thereof. The network 120 may be further configured to support network protocols such as Transmission Control Protocol/Internet Protocol, IEEE 802.5, Asynchronous Transfer Mode, Cellular Digital Packet Data, MOBITEX, IEEE 801.11b, and other similar network protocols.

The shared file system 130 may be configured to provide storage of data and/or software applications for the system 100. The shared file system 130 may be a network accessible disk drive and/or array of disks.

Optionally, the system 100 may include a key distribution center 140. The key distribution center 140 may be configured to provide a secure method of transferring the initial cryptographic file key, the owner's public key, and private share information within the system 100.

In accordance with one aspect of the present invention, an owner may revoke user access to a file by utilizing the security module 115. In a cryptographic key owner mode, the security module 115 may be configured to generate a new cryptographic key based on the current cryptographic key and key rotation catalyst. The security module 115 may then utilize the new version of the cryptographic key to encrypt the file for storage on the shared file system 130 or elsewhere.

As already stated, an authorized user may utilize the security module 115 to decrypt the encrypted file and the security module 115 may be configured to determine which version of the cryptographic key was utilized to encrypt a selected file. If the security module 115 determines that the selected file is encrypted with a previous version of the cryptographic key, the security module 115 may be further configured to generate the previous version of the cryptographic key based on the key rotation catalyst and the current cryptographic key the authorized user holds. Accordingly, an owner may revoke a user from future versions of files, while still permitting access by authorized users to the files that may not have been updated and are hence encrypted with a previous version of the key. Thus, lazy revocation is enabled in an environment where a server may not be trusted. Moreover, by enabling lazy-revocation through recursive key generation, the number of cryptographic keys in the cryptographic system remains minimal since previous versions of cryptographic keys may be generated from later versions by the authorized user while still barring access to unauthorized users.

Initially, the owner may generate various items to setup the key management. For example, the owner may generate a public key, a private key, and an initial cryptographic file key.

The public and private keys are not used to encrypt the files, but rather in the cryptographic key management. To generate the owner's public and private keys, the owner may select safe Sophie-Germain primes $p$, $q$, $p_1$, $p_2$, where $p|q-1$ and the minimum $(|\phi(p_1 p_2)|, |q|)=2^s$, where s is the security parameter. A value "n" may be set to "$p_1 p_2$", the RSA (Rivest-Shamir-Adleman) modulus. A value "g" may be established to be a generator of $Z_q$, such that the DDH (Decisional Diffie-Hellman) assumption holds for $Z_q$ and "g". A random RSA public key "e" and a private key "d" may be generated according to a conventional fashion where $ed \equiv 1 \mod \phi(n)$. However, the present invention is not limited to this method of calculating the owner's public and private keys. More generally, any asymmetric cryptosystem may be used. Further, rather than using public and private keys, a secure hash function may be used, in which case the owner pre-computes the hash sequence in advance.

The generation of the initial cryptographic file key comprises generating multiple items, one of which may be a random polynomial. For a system allowing t−1 simultaneous revocations, the file owner may generate a random polynomial, $p(\ )$, of degree t over $Z_q$. To generate the initial cryptographic file key, the owner may calculate the value of the polynomial at zero, $P(0)$, and a random number $r_0$ to be used as an exponent factor. However, the polynomial may be evaluated at a point other than zero. The initial cryptographic file key, $K_0$, may be set according to Equation 1, with "g" being the generator discussed above.

$$K_0 = g^{r_0 P(0)} \qquad \text{Equation 1:}$$

The owner may also generate a random number, $\gamma_0$, to be used as a key rotation catalyst. The key rotation catalyst does not have to be used in creating the initial cryptographic key, but it is used to generate cryptographic key updates.

From time to time, the owner generates a new cryptographic key, based on a previous cryptographic key. The owner may generate a new cryptographic file key as follows. The owner may generate a new exponent factor ($r_i$) and a new key rotation catalyst ($\gamma_i$) according to Equations 2 and 3.

$$\text{Equation 2:} \quad r_i = \frac{r_{i-1}}{\gamma_{i-1}} \mod q$$

$$\text{Equation 3:} \quad \gamma_i = \frac{1}{\gamma_{i-1}^{d_i}} \mod n$$

Equation 3 may be described as performing an encryption of the previous key rotation catalyst with the owner's private key, "d". This may be an RSA encryption, but the present invention is not so limited. More generally, the new key rotation catalyst is generated by applying a one-way function to the old key rotation catalyst. In this fashion, it is easy for users (or others) to obtain previous versions only of they have a later version of the key rotation catalyst. Thus, instead of the encryption used in Equation 3, a secure hash could be used. Further, any other asymmetric cryptosystem could be used to generate the new key rotation catalyst from the previous key rotation catalyst. Equation 2 may be described as dividing the previous exponent factor by the previous key rotation catalyst. However, the present invention is not limited to this technique of generating the new exponent factor, $r_i$.

The new cryptographic file key, $K_i$, is given by Equation 4, where "g" is the generator and $r_i$ is taken from Equation 2.

$$K_i = g^{r_i P(0)} \qquad \text{Equation 4:}$$

Further, the owner generates a user numeric identity, "u", and a secret share $P(u)$ for each valid user. The numeric identity and the secret share may be sent securely to a given user, who uses it in generating the new cryptographic key non-interactively.

The owner may revoke a user by generating a new cryptographic file key and publishing information that allows retained users to generate the new cryptographic key, but does not allow the revoked user to generate the new cryptographic key. For example, the owner may publish a version of the revoked user's secret share and the key rotation catalyst, $\gamma_{i-1}$. The version of the revoked user's secret share may be $(u, g^{r_i P(u)})$, where "u" is the revoked user's numeric identity, "g" is a generator, $r_i$ is an exponent factor, and $P(u)$ is the revoked user's secret share that was provided to the user. The owner may also publish the value of $g^{r_i}$, which is based on the new key, as seen in Equation 4.

A retained user is able to generate the new cryptographic key using $g^{r_i}$, the version of the revoked user's secret share, the retained user's own secret share, and the current cryptographic key. The user may also need to have other public shares to generate the new cryptographic key, as discussed below. However, the revoked user cannot generate the new cryptographic key because the revoked user lacks sufficient information. For example, his published private share information is redundant to him.

A non-revoked user may generate the new cryptographic file key with polynomial interpolation, such as LaGrange polynomial interpolation. For example, the new group key is $K_i = g^{r_i P(0)}$. Since $$P(0) = \sum_{i=0}^{t} \lambda_i P(u_i), \lambda_i = \prod_{j \neq i} \frac{u_j}{u_j - u_i},$$

it follows that $$K_i = g^{r_i \sum_{i=0}^{t} \Sigma \lambda_i P(u_i)} = \prod_{i=0}^{t} g^{r_i \lambda_i P(u_i)}.$$

In the event the polynomial is not evaluated at zero, an appropriate variant of the formulas may be used.

Embodiments of the present invention provide security for up to "t−1" revocations when using a random polynomial of degree "t". For example, in order for the non-revoked users to be able to generate the new key non-interactively, the owner may publish up to "t−1" shares of information. Each user then utilizes their own private share as the final bit of information needed to generate the new key via interpolation. The published information can include a mix of dummy shares and a version of the revoked user's private shares. The dummy shares may be of the form $g^{r_i P(y)}$ and the version of the revoked user's private share may be of the form $g^{r_i P(u)}$, where P(u) is the revoked user's private share.

To keep a user revoked, the revoked user's private share continues to be used in the public share information. This prevents revoked users from colluding. After "t" revocations, the owner starts over with a new initial key.

Embodiments of the present invention can be used to recover intermediate keys lost due to a lossy network. Thus, even if one or more versions of the published information are not received by a user, that user can reconstruct the missed information. For example, a key rotation catalyst may fail to be properly posted on the bulletin board or may be removed from the bulletin board before the user retrieves it. As long as the user gets a future key rotation catalyst, the user can work backwards to recreate all key rotation catalysts, in this embodiment.

FIG. 2 illustrates an exemplary diagram 200 of a recursive key generation process in accordance with an embodiment of the present invention. As shown in FIG. 2, the user may generate cryptographic key, $K_1$, from $K_2$ by the relationship $K_1 = K_2^{\gamma_1}$. Similarly, cryptographic key, $K_2$, may be generated by the recursive relationship of $K_2 = K_1^{\gamma_1}$. Thus, the user can compute according to the formula in Equation 5, where $\gamma_{i-1}$ is the previous key rotation catalyst.

$$K_{i-1} = K_i^{\gamma_{i-1}} \quad \text{Equation 5:}$$

In a more general form, the owner may calculate cryptographic keys that are more than one generation old in a single operation, as shown in Table 1.

TABLE 1

$K_2 = K_3^{\gamma_2}$ $K_1 = K_3^{\gamma_2 \gamma_1}$ $K_0 = K_3^{\gamma_2 \gamma_1 \gamma_0}$ $K_0 = K_3^{\gamma_2 \gamma_2^3 \gamma_2^2}$ $K_{i-w} = K_i^{\gamma-1 \frac{1-c^w}{1-c}}$ FIG. 3A illustrates a diagram of an exemplary file data structure 300 utilized by an embodiment of the present invention. As shown in FIG. 3A, the file data structure 300 includes a header portion (or metadata) 310 with an encrypted file 320. The security module 115 may be configured to attach the header portion 310 onto the encrypted file 320 during the encryption process. The header portion 310 may contain information related to the version of the cryptographic key used in the encryption. The header portion 310 may be implemented using a variety of methods such as a bit map.

FIG. 3B illustrates a diagram of an exemplary cryptographic key data structure 330 utilized by an embodiment of the present invention. As shown in FIG. 3B, the cryptographic key data structure 330 may include a header portion (or metadata) 340 with a cryptographic key 350, where the cryptographic key 350 may be used to encrypt a selected file. The header portion 340 may be configured to provide information related to the version of the cryptographic key and the file owner. The header portion 340 may be implemented using a variety of methods such as a bit map, bit fields, etc. The security module 115 may be configured to initialize the header portion 340 to an initial value (e.g., 0 or 1) during the generation of the cryptographic key. For each time a new version of the current cryptographic key is generated, the security module 115 may be configured to increment the value in the header portion 340 by one. The security module 115 may be further configured to add information related to the owner of the file in the header portion 340 during the generation of the cryptographic key.

Figure 4:
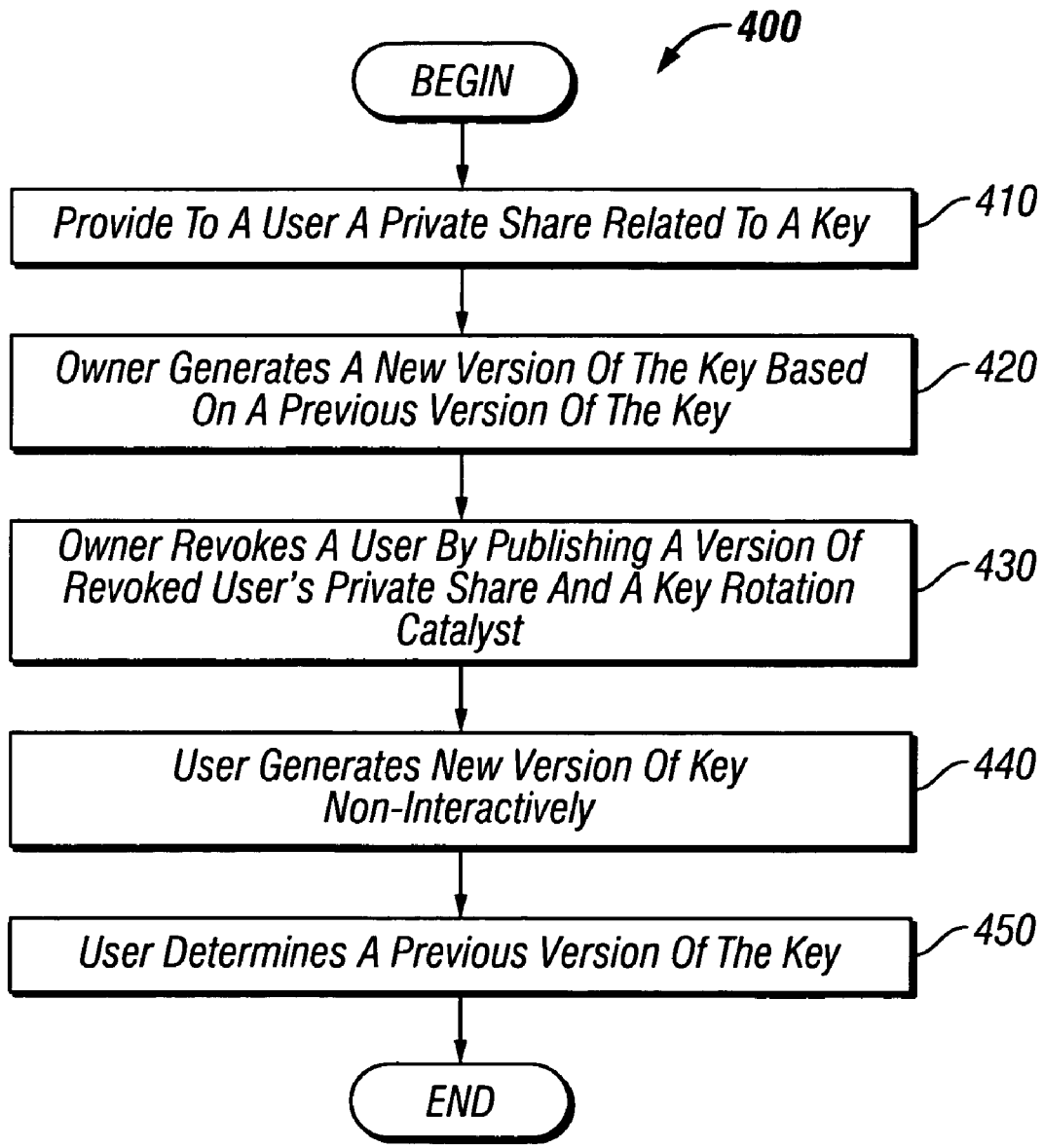
FIG. 4 illustrates steps of a process of relating cryptographic keys in accordance with an embodiment of the present invention.

An embodiment of the present invention is a method of relating cryptographic keys. Steps of process 400 of FIG. 4 may be stored as instructions on a computer readable medium and executed on a general-purpose processor. In step 410, a user is provided a private share related to a cryptographic key. For example, the private share may be the value of a polynomial evaluated at a point, P(u). That point may be the user's numeric identity (u), which may also be provided to the user. This information may be provided securely.

In step 420, a new version of a cryptographic file key is generated, based on a previous version of the cryptographic file key. For example, an owner may perform an encryption of a previous version of a key rotation catalyst to generate a new key rotation catalyst, γ. However, any asymmetric cryptosystem may be used. Then, a new exponent factor, $r_i$, may be calculated by dividing the previous exponent factor, $r_{i-1}$, by the previous key rotation catalyst. The new cryptographic key may be formed by raising a generator, "g", to a power that comprises the new exponent factor, $r_i$, and a randomly generated polynomial evaluated at a point (e.g., zero).

In step 430, a key rotation catalyst and a version of a revoked user's private share are published. The version of the revoked user's private share may comprise the revoked user's numeric identity, "u", and a value of the generator, "g", raised to a power that comprises the new exponent factor, $r_i$, and the revoked user's private share, P(u). The owner may also publish dummy shares. A generator, "g", raised to the $r_i$ may be published as well.

In step 440, a user non-interactively generates the new version of the cryptographic file key. This step may be performed by someone other than a user as well. For example, the user accesses the key rotation catalyst, γ, and the version of a revoked user's private share, which were published in step 430. The user may perform a decryption of the key rotation catalyst with the owner's public key, "e". This provides the user with the previous version of the key rotation catalyst. The user determines the new cryptographic key by the methods described above herein. For example, the user interpolates using the various shares.

In step 450, the user generates a previous version of the cryptographic file key. This step may be performed by someone other than a user as well. The user may accomplish this by raising the value of the new cryptographic key to the power given by the value of a previous key rotation catalyst. Equation 5 defines such a process.

Figure 5:
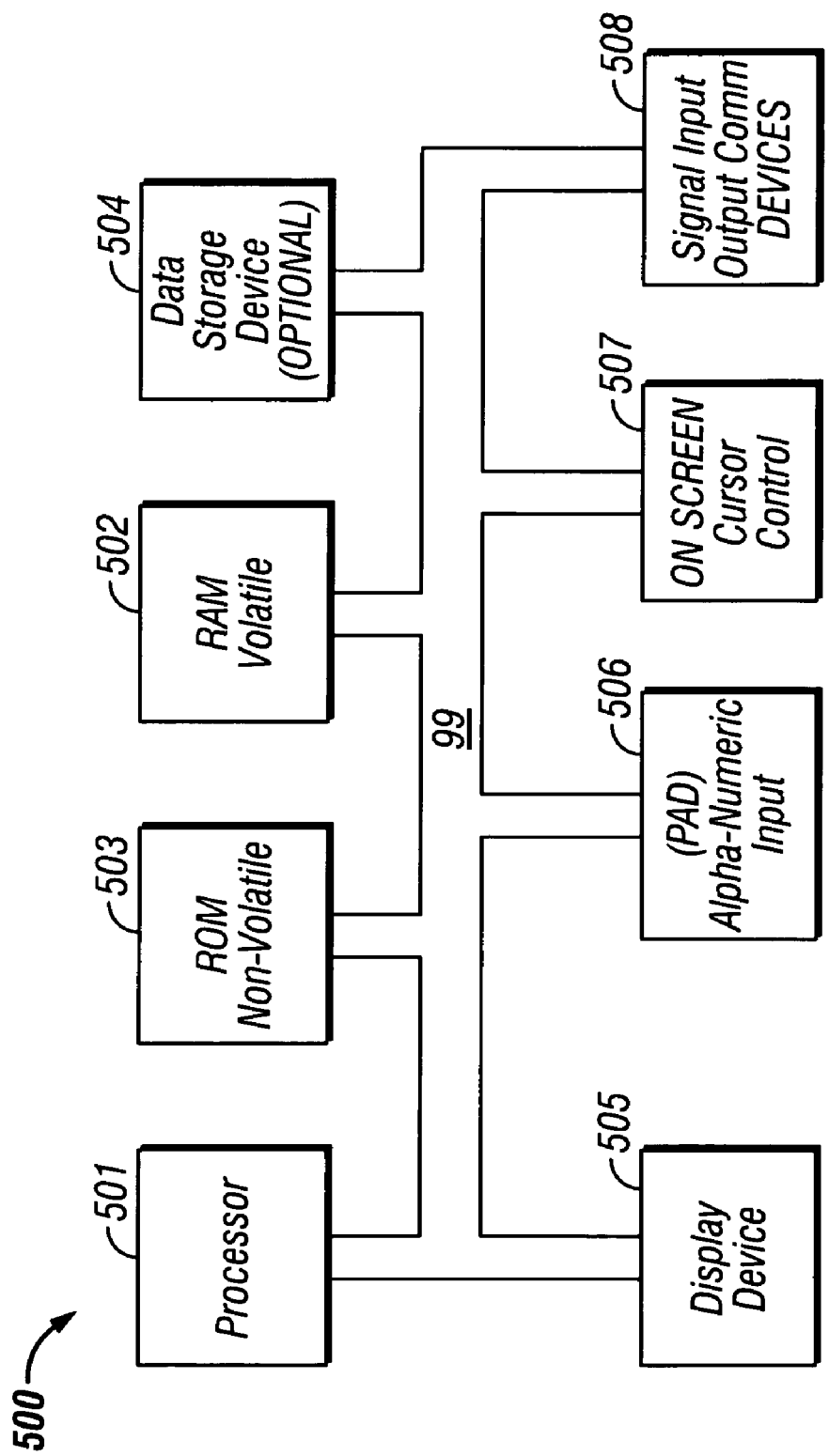
FIG. 5 is an exemplary computer system that may serve as a platform for embodiments of the present invention.

With reference now to FIG. 5, portions of embodiments of the present invention are comprised of computer-readable and computer-executable instructions that reside, for example, in computer-usable media of a computer system. For example, computer system 500 may be used as a platform for security module 115. FIG. 5 illustrates an exemplary computer system 500 used to perform a method in accordance with embodiments of the present invention. It is appreciated that system 500 of FIG. 5 is exemplary only in that embodiments of the present invention can operate within a number of different computer systems including general purpose networked computer systems, embedded computer systems, and stand alone computer systems. Additionally, computer system 500 of FIG. 5 is well adapted to having computer readable media such as, for example, a floppy disk, a compact disc, and the like coupled thereto. Such computer readable media is not shown coupled to computer system 500 in FIG. 5 for purposes of clarity.

System 500 of FIG. 5 includes an address/data bus 99 for communicating information, and a central processor unit 501 coupled to bus 99 for processing information and instructions. System 500 also includes data storage features such as a computer usable volatile memory 502, e.g., random access memory (RAM), coupled to bus 99 for storing information and instructions for central processor unit 501, computer usable non-volatile memory 503, e.g. read only memory (ROM), coupled to bus 99 for storing static information and instructions for the central processor unit 501, and an optional data storage unit 504 (e.g., a magnetic or optical disk and disk drive) coupled to bus 99 for storing information and instructions.

With reference still to FIG. 5, system 500 of embodiments of the present invention also includes an optional alphanumeric input device 506 including alphanumeric and function keys is coupled to bus 99 for communicating information and command selections to central processor unit 501. System 500 also optionally includes a cursor control device 507 coupled to bus 99 for communicating user input information and command selections to central processor unit 501. System 500 of the present embodiment also includes an optional display device 505 coupled to bus 99 for displaying information. Signal input/output communication device(s) 508 coupled to bus 99 is connected to a network (e.g., network 120) and controls the flow of information over the network.

While the present invention has been described in particular embodiments, it should be appreciated that the present invention should not be construed as limited by such embodiments, but rather construed according to the below claims.

We claim:

1. A method for relating cryptographic keys, comprising:
   providing, by a computing device, to a user a private share related to a key;
   generating, by the computing device, a new version of the key based on a previous version of the key; and
   publishing, by the computing device, a key rotation catalyst, wherein the new version of the key is determinable based on the key rotation catalyst and the private share, and wherein former versions of the key are determinable based on the key rotation catalyst.

2. The method of claim 1, wherein said publishing further comprises:
   publishing at least one public share related to the key, wherein the new version of the key is determinable based on the key rotation catalyst, the private share, and the at least one public share.

3. The method of claim 1, wherein said publishing further comprises revoking the user by publishing a version of the revoked user's private share.

4. The method of claim 1, further comprising generating an initial key based on a random polynomial.

5. The method of claim 4, wherein the private share comprises the value of the random polynomial evaluated at a point associated with the user.

6. A method for relating cryptographic keys, comprising:
   providing, by a computing device, to a user a private share related to a key;
   generating, by the computing device, a new version of the key based on a previous version of the key; and
   publishing, by the computing device, a key rotation catalyst, wherein the new version of the key is determinable based on the key rotation catalyst and the private share, and wherein former versions of the key are determinable based on the key rotation catalyst,
   wherein said publishing further comprises generating the key rotation catalyst by performing an encryption of a previous key rotation catalyst.

7. The method of claim 6, wherein the encryption is according to an RSA (Rivest-Shamir-Adleman) encryption.

8. A method for relating cryptographic keys, comprising:
   providing, by a computing device, to a user a private share related to a key;
   generating, by the computing device, a new version of the key based on a previous version of the key; and
   publishing, by the computing device, a key rotation catalyst, wherein the new version of the key is determinable based on the key rotation catalyst and the private share, and wherein former versions of the key are determinable based on the key rotation catalyst; and
   determining a previous version of the key rotation catalyst by decrypting the key rotation catalyst.

9. The method of claim 8, wherein said determining comprises determining a previous version of the key rotation catalyst by decrypting the key rotation catalyst according to an algorithm that is according to the RSA (Rivest-Shamir-Adleman) algorithm.

10. A method for relating cryptographic keys, comprising:
providing, by a computing device, to a user a private share related to a key;
generating, by the computing device, a new version of the key based on a previous version of the key;
publishing, by the computing device, a key rotation catalyst, wherein the new version of the key is determinable based on the key rotation catalyst and the private share, and wherein former versions of the key are determinable based on the key rotation catalyst; and
generating a previous version of the key by exponentiating the new version of the key by the key rotation catalyst.

11. A method of generating a cryptographic key comprising:
generating, by a computing device, a new version of a key rotation catalyst based on a previous version of the key rotation catalyst;
modifying, by the computing device, a portion of an exponent used in forming a current cryptographic key by the previous version of the key rotation catalyst; and
forming, by the computing device, a first new cryptographic key from the current cryptographic key by exponentiating the current cryptographic key by an exponent comprising the modified portion of the exponent and a random polynomial evaluated at a point; and
publishing, by the computing device, information to enable other nodes to generate the first new cryptographic key.

12. The method of claim 11, further comprising:
repeating said generating and modifying to form a further new version of the key rotation catalyst and a further modified portion of the portion of the exponent; and
forming a further new cryptographic key from the first new cryptographic key by exponentiating the first new cryptographic key by an exponent comprising the further modified portion of the exponent and the random polynomial evaluated at the point.

13. The method of claim 11, wherein publishing the information comprises publishing the previous version of the key rotation catalyst.

14. The method of claim 13, further comprising:
securely transferring a value of the random polynomial evaluated at a second point to a user.

15. A method of generating a cryptographic key comprising:
generating, by a computing device, a new version of a key rotation catalyst based on a previous version of the key rotation catalyst;
modifying, by the computing device, a portion of an exponent used in forming a current cryptographic key by the previous version of the key rotation catalyst; and
forming, by the computing device, a first new cryptographic key from the current cryptographic key by exponentiating the current cryptographic key by an exponent comprising the modified portion of the exponent and a random polynomial evaluated at a point; and
publishing, by the computing device, information to enable other nodes to generate the first new cryptographic key,
wherein said generating comprises generating the new version of the key rotation catalyst by performing an encryption of the previous version of the key rotation catalyst that is according to an RSA (Rivest-Sbaniir-Adleman) encryption.

16. A computer readable storage medium having stored thereon instructions which when executed on a general purpose processor implement a method of managing encrypted data, comprising:
transferring to a user a private share related to a cryptographic key;
generating a new version of the cryptographic key based on a previous version of the cryptographic key; and
publishing a key rotation catalyst, wherein the new version of the cryptographic key is determinable based on the key rotation catalyst and the private share without interacting directly with the key rotation catalyst publisher, and wherein former versions of the cryptographic key are determinable based on the key rotation catalyst.

17. The computer readable storage medium of claim 16, wherein said publishing further comprises:
publishing at least one public share related to the cryptographic key, wherein the new version of the cryptographic key is determinable based on the key rotation catalyst, the private share, and the at least one public share.

18. The computer readable storage medium of claim 16, wherein said publishing further comprises revoking a user by publishing a version of a revoked user's private share, wherein other users have sufficient information to determine the new cryptographic key but the revoked user does not.

19. The computer readable storage medium of claim 16, wherein said publishing further comprises comprising generating an initial cryptographic key based on a random polynomial.

20. A computer readable storage medium having stored thereon instructions which when executed on a general purpose processor implement a method of managing encrypted data, comprising:
transferring to a user a private share related to a cryptographic key;
generating a new version of the cryptographic key based on a previous version of the cryptographic key; and
publishing a key rotation catalyst, wherein the new version of the cryptographic key is determinable based on the key rotation catalyst and the private share without interacting directly with the key rotation catalyst publisher, and wherein former versions of the cryptographic key are determinable based on the key rotation catalyst,
wherein said publishing further comprises generating the key rotation catalyst by performing an encryption of the previous key rotation catalyst that is according to an RSA (Rivest-Shamir-Adleman) encryption.

21. A computer readable storage medium having stored thereon instructions which when executed on a general purpose processor implement a method of managing encrypted data, comprising:
transferring to a user a private share related to a cryptographic key;
generating a new version of the cryptographic key based on a previous version of the cryptographic key;
publishing a key rotation catalyst, wherein the new version of the cryptographic key is determinable based on the key rotation catalyst and the private share without interacting directly with the key rotation catalyst publisher, and wherein former versions of the cryptographic key are determinable based on the key rotation catalyst;

generating a previous version of the cryptographic key by exponentiating the current cryptographic key by the key rotation catalyst.

22. A computer readable storage medium having stored thereon instructions which when executed on a general purpose processor implement a method of managing encrypted data, comprising:

transferring to a user a private share related to a cryptographic key;

generating a new version of the cryptographic key based on a previous version of the cryptographic key;

publishing a key rotation catalyst, wherein the new version of the cryptographic key is determinable based on the key rotation catalyst and the private share without interacting directly with the key rotation catalyst publisher, and wherein former versions of the cryptographic key are determinable based on the key rotation catalyst; and determining, when acting as a user, a previous version of the key rotation catalyst by decrypting the key rotation catalyst.

23. The computer readable storage medium of claim 22, wherein said determining comprises determining a previous version of the key rotation catalyst by decrypting the key rotation catalyst according to an RSA (Rivest-Shamir-Adleman) algorithm.

* * * * *

UNITED STATES PATENT AND TRADEMARK OFFICE
CERTIFICATE OF CORRECTION

PATENT NO. : 7,313,238 B2
APPLICATION NO. : 10/355470
DATED : December 25, 2007
INVENTOR(S) : Kevin E. Fu et al.

It is certified that error appears in the above-identified patent and that said Letters Patent is hereby corrected as shown below:

In column 7, line 21, delete

" $K_l = g^{r_i \Sigma_{i=0}^t \Sigma \lambda_i P(u_i)} = \prod_{i=0}^t g^{r_i \lambda_i P(u_i)}$ " and insert -- $K_l = g^{r_i \sum_{i=0}^t \lambda_i P(u_i)} = \prod_{i=0}^t g^{r_i \lambda_i P(u_i)}$ --, therefor.

In column 8, in table 1, line 4, delete " $K_0 = K_3^{\gamma_2 \gamma_2^3 \gamma_2^2}$ " and insert -- $K_0 = K_3^{\gamma_2 \gamma_2^e \gamma_2^{e^2}}$ --, therefor.

In column 11, lines 66-67, in Claim 15, delete "(Rivest-Sbaniir-Adleman)" and insert -- (Rivest-Shamir-Adleman) --, therefor.

Signed and Sealed this

Nineteenth Day of May, 2009

JOHN DOLL
*Acting Director of the United States Patent and Trademark Office*